United States Patent
Schwarz

(10) Patent No.: US 11,209,871 B2
(45) Date of Patent: Dec. 28, 2021

(54) EXPLOSION-PROOF TABLET FORM CLOSURE HOUSING

(71) Applicant: ECOM INSTRUMENTS GMBH, Assamstadt (DE)

(72) Inventor: Michael Schwarz, Igersheim (DE)

(73) Assignee: ECOM INSTRUMENTS GMBH, Assamstadt (DE)

( * ) Notice: Subject to any disclaimer, the term of this patent is extended or adjusted under 35 U.S.C. 154(b) by 0 days.

(21) Appl. No.: 16/640,810

(22) PCT Filed: Aug. 23, 2018

(86) PCT No.: PCT/IB2018/001040
§ 371 (c)(1),
(2) Date: Feb. 21, 2020

(87) PCT Pub. No.: WO2019/038591
PCT Pub. Date: Feb. 28, 2019

(65) Prior Publication Data
US 2021/0034113 A1    Feb. 4, 2021

Related U.S. Application Data

(60) Provisional application No. 62/549,659, filed on Aug. 24, 2017.

(51) Int. Cl.
| G06F 1/16 | (2006.01) |
| H05K 5/00 | (2006.01) |
| H05K 7/00 | (2006.01) |

(52) U.S. Cl.
CPC .... *G06F 1/1656* (2013.01); *G06F 2200/1633* (2013.01)

(58) Field of Classification Search
CPC .... G06F 1/1656; G06F 1/1613; G06F 1/1616; G06F 1/1633
See application file for complete search history.

(56) References Cited

U.S. PATENT DOCUMENTS

2004/0085738 A1*  5/2004  Barth .................. G06F 1/1626
                                                                     361/725

FOREIGN PATENT DOCUMENTS

| KR | 100650652 | 11/2006 |
| WO | WO2018/148066 | 8/2018 |

OTHER PUBLICATIONS

International Search Report and Written Opinion, dated Jan. 4, 2019, in connection with PCT/IB2018/001040, filed Aug. 23, 2018.

* cited by examiner

Primary Examiner — Anthony M Haughton
(74) Attorney, Agent, or Firm — Fay Sharpe LLP

(57) ABSTRACT

An explosion-proof enclosure includes a front cover (first housing half or portion) and a rear cover (second housing half or portion) joined together by a retention member inserted into a passageway at least partially formed by structures of both the front cover and the rear cover. The enclosure includes an internal chamber for containing an associated electronic device. The passageway generally extends peripherally about the internal chamber. In one exemplary embodiment, the retention member is a ball-chain and the passageway completely surrounds the internal chamber such that respective end portions of the ball-chain overlap. A sealing element is provided for sealing respective mating surfaces of the front cover and rear cover. In another example, the retention member is a rigid split retention member.

18 Claims, 21 Drawing Sheets

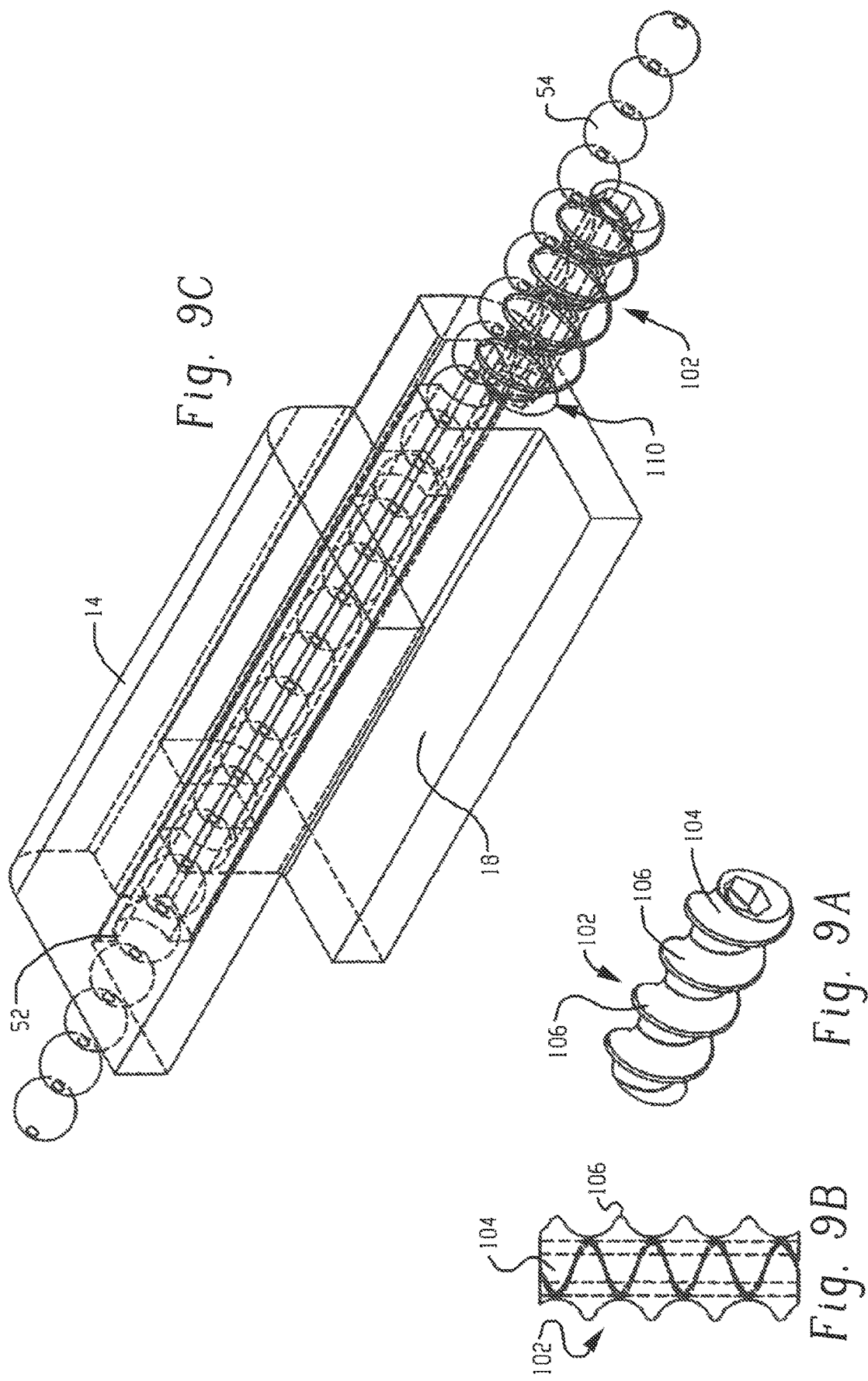

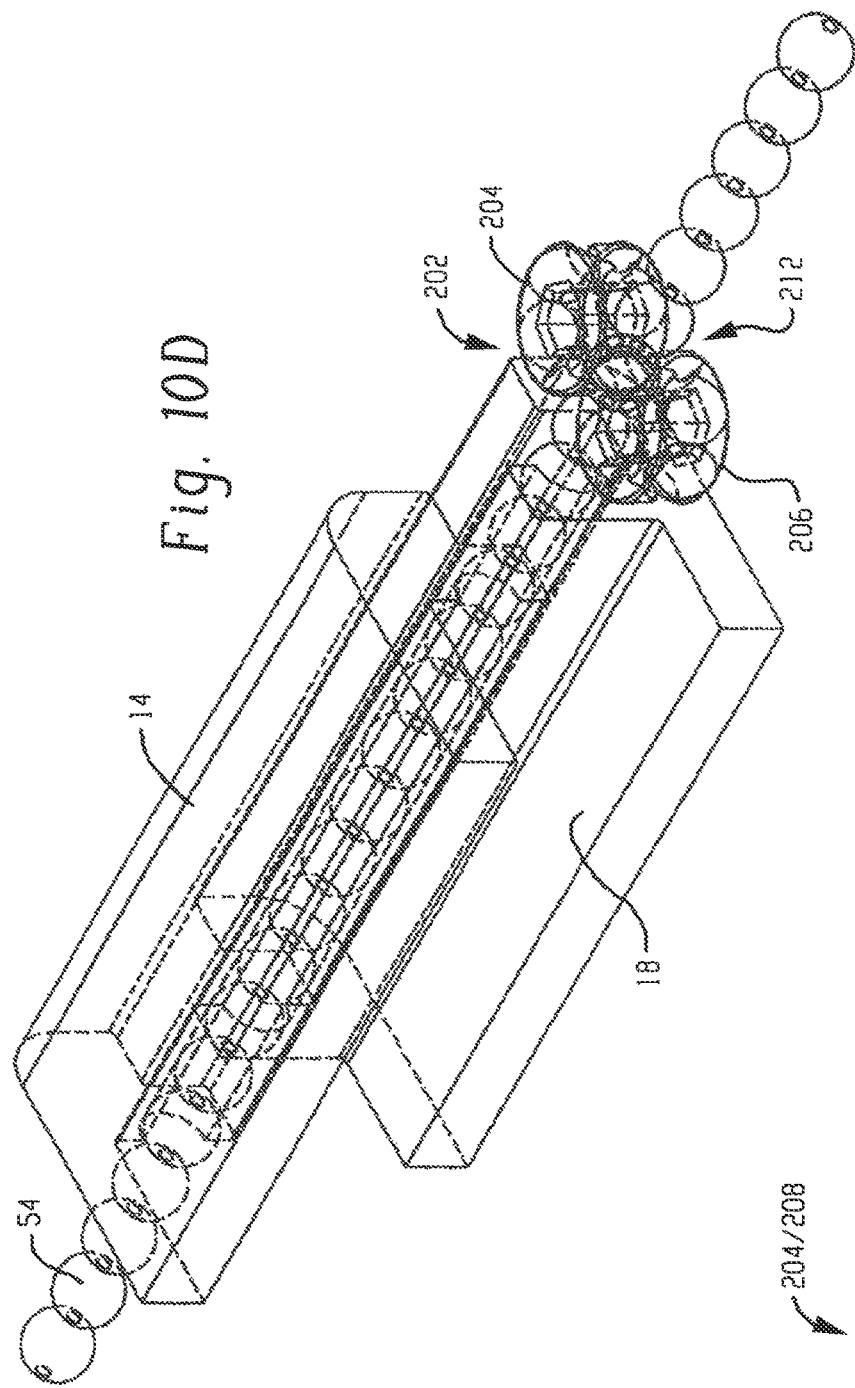
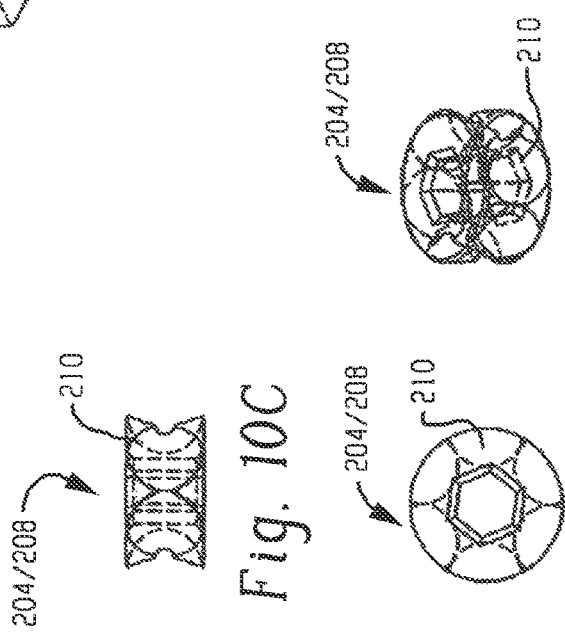
Fig. 10D
Fig. 10A
Fig. 10B    Fig. 10C

EXPLOSION-PROOF TABLET FORM CLOSURE HOUSING

CROSS REFERENCE TO RELATED PATENTS AND APPLICATIONS

This application claims priority to and the benefit of the filing date of International Application No. PCT/IB2018/001040, filed Aug. 23, 2018, which application claims priority to U.S. Provisional Patent Application Ser. No. 62/549,659, filed Aug. 24, 2017, which applications are hereby incorporated by reference.

BACKGROUND

The use of electronic devices, such as tablets and cell phones for example, in certain environments where explosive chemicals may be present can be an ignition hazard. For example, a static discharge from the device, or a malfunction of the device (e.g., battery explosion) can ignite explosive chemicals near the device.

Accordingly, it is known to provide explosion-proof enclosures for electrical devices used in the explosion-prone areas. Such devices generally comprise front and rear mating covers that surround and enclose the electronic device to prevent explosive gasses from coming into contact with the electronic device and/or any spark or ignition source generated by the electronic device. The front and rear cover can be joined together with adhesive, in which case it is generally very difficult to reopen the enclosure should access to the electronic device become necessary. In other arrangements, the front and rear cover can be joined together with fasteners, such as screws or the like, that make separating the front and rear cover easier when access to the electronic device is necessary.

While the prior art enclosures may provide suitable ignition protection, enclosures joined with adhesives are not generally serviceable, while enclosures joined with metal screws or other metal fasteners are less desirable as they are more difficult to obtain certification from certain regulatory bodies and require recertification any time a fastener's location is changed (for design purposes or other reasons).

SUMMARY

In accordance with one or more aspects of the present disclosure, an explosion-proof enclosure includes a front cover (first housing half or portion) and a rear cover (second housing half or portion) joined together by a ball-chain inserted into a passageway at least partially formed by structures of both the front cover and the rear cover. The enclosure includes an internal chamber for containing an associated electronic device. The passageway generally extends peripherally about the internal chamber. In one exemplary embodiment, the passageway completely surrounds the internal chamber such that respective end portions of the ball-chain overlap. A sealing element is provided for sealing respective mating surfaces of the front cover and rear cover.

An enclosure constructed in accordance with the present disclosure may streamline certification and/or recertification of various configurations of the enclosure because the mechanism used to join the respective enclosure portions (e.g., front cover, back cover) is the same regardless of the shape or size of the enclosure, while providing a continuous 360 degree fastening of the portions (unlike enclosures using threaded fasteners) and remaining capable of readily being disassembled (unlike adhesive-based constructions).

In accordance with one aspect, an enclosure for an electronic device comprises first and second housing portions adapted to be joined together by a retention member received in a passageway at least partially formed by portions of each of the first and second housing portions, wherein the retention member restricts separation of the first and second housing portions when received in the passageway.

The first and second housing portions can include mating structures, said mating structures at least partially forming the passageway. Each mating structure can include a flange and a channel, said flange and channel of a first mating structure of the first housing portion adapted to mate with a corresponding channel and flange, respectively, of a second mating structure associated with the second housing portion. A surface of the flange and a surface of the channel of each mating structure can form at least a portion of the passageway. The passageway can have a circular cross-section, and each of the first and second housing portions can include a semi-circular recess that together form at least a portion of the passageway. The passageway can be centered on a parting line of the first and second housing portions, and the mating structures can form a labyrinth interface between the first and second housing portions. A sealing element can be located outwardly of the passageway, the sealing element can extend continuously about a periphery of the enclosure. The passageway can be curved along one or more portions of its length, and the retention member can be flexible about its longitudinal axis such that it can be inserted longitudinally into the passageway. The retention member can include a ball-chain. The ball-chain can be inserted and/or removed from the passageway using a telescoping tool, a ball-screw, or a ball-wheel configured to advance/withdraw the ball-chain. An aperture can be provided extending from the passageway to an exterior of the enclosure, the aperture providing a pathway for insertion of the retention member into the passageway from an exterior of the enclosure, and further comprising a closure member for closing the aperture. The retention member can be removable from the passageway to enable separation of the first and second housing portions, and removal of the electronic device for service, replacement, etc.

In accordance with another aspect, a method of assembling an enclosure for an electronic device comprises assembling a first and a second housing portion together to form an interior chamber for the electronic device, and installing a retention member into a passageway at least partially formed by the first and second housing members, wherein the retention member restricts separation of the first and second housing members.

The enclosure can include an aperture in communication with the passageway and opening to an exterior of the enclosure, and the method can further include installing the retention member in the passageway via the aperture. The method can also include installing a closure member in the aperture after insertion of the retention member. The first and second housing portions can include mating structures, each mating structure can include a flange and a channel, said flange and channel of a first mating structure of the first housing portion adapted to mate with a corresponding channel and flange, respectively, of a second mating structure associated with the second housing portion. The method can include engaging the mating structures prior to insertion of the retention member in the passageway, and/or applying a compressive force to the first and second housing portions to align respective surfaces thereof forming the passageway, and inserting the retention member into the passageway while maintaining the application of the compressive force. A tool can be used to install the retention member in the passageway. The tool can include a push rod telescopically received in a tube adapted to support the retention member in position for insertion into the passageway. In other embodiments, a ball-screw or a ball-wheel can be used to advance/withdraw the retention member. In other embodiments, a spindle can be used to draw the retention member into the passageway. A seal element can be provided at an interface of the first and second housing portions.

In accordance with another aspect of the present disclosure, a retention member for joining respective components is inserted in a first orientation into a passageway at least partially formed by structures of each respective component, and rotated to a second orientation to lock the respective components together. In one embodiment, the retention member a cylinder and is comprised of two semi-cylindrical components.

BRIEF DESCRIPTION OF THE DRAWINGS

FIG. 9A is a perspective view of an exemplary ball-screw in accordance with the present disclosure;

FIG. 9B is a side elevational view of the ball-screw of FIG. 9A;

FIG. 9C is a perspective view of the ball-screw in combination with an enclosure;

FIG. 10A is perspective view of one wheel of a ball-wheel in accordance with the present disclosure;

FIG. 10B is a plan view of the one wheel of FIG. 10A;

FIG. 10C is a side elevational view of the one-wheel of FIG. 10A;

FIG. 10D is a perspective view of a ball-wheel in accordance with the present disclosure in combination with an enclosure;

DETAILED DESCRIPTION

Figure 1A:
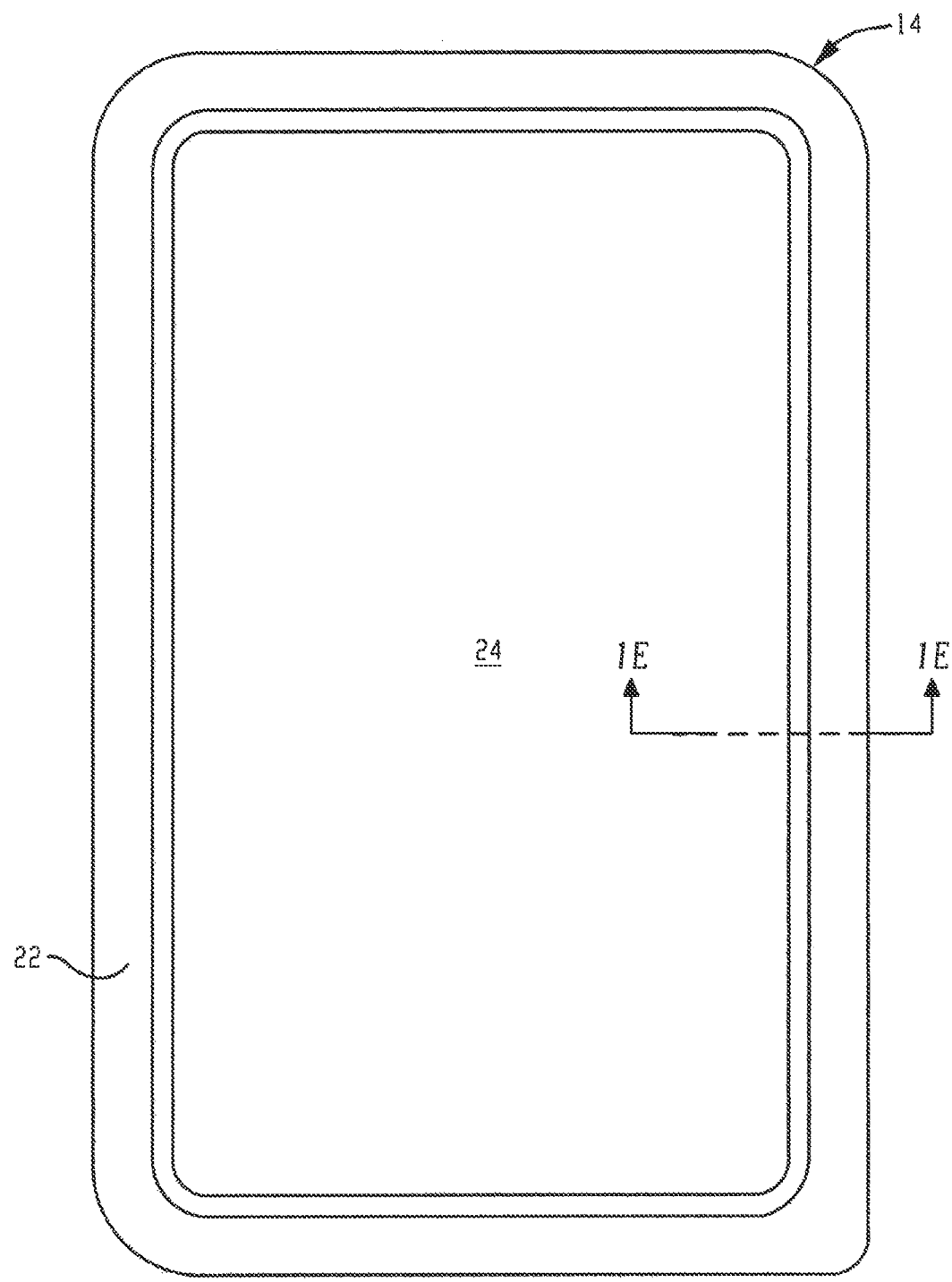
FIG. 1A is a top view of a first housing half of an exemplary enclosure in accordance with the present disclosure.
Figure 1B:
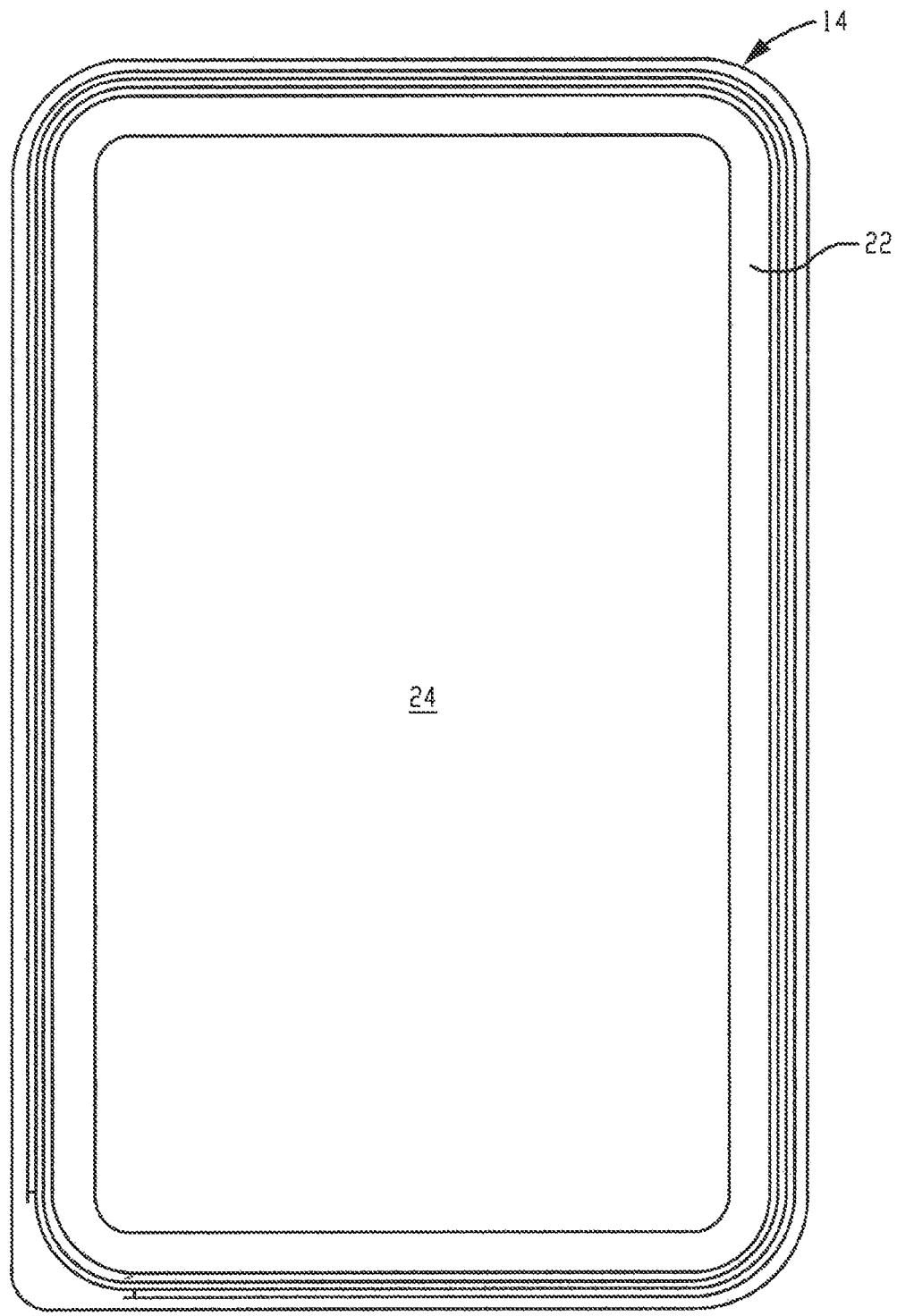
FIG. 1B is a rear view of the first housing half.
Figure 1C:
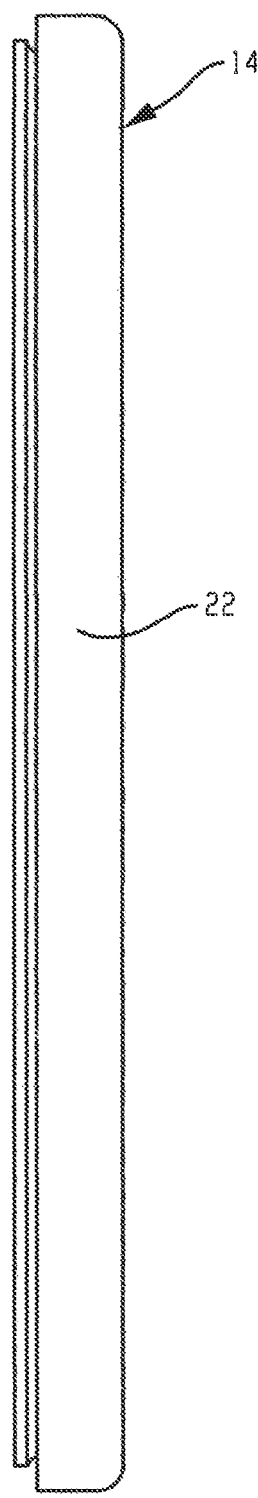
FIG. 1C is a side view of the first housing half.
Figure 1D:
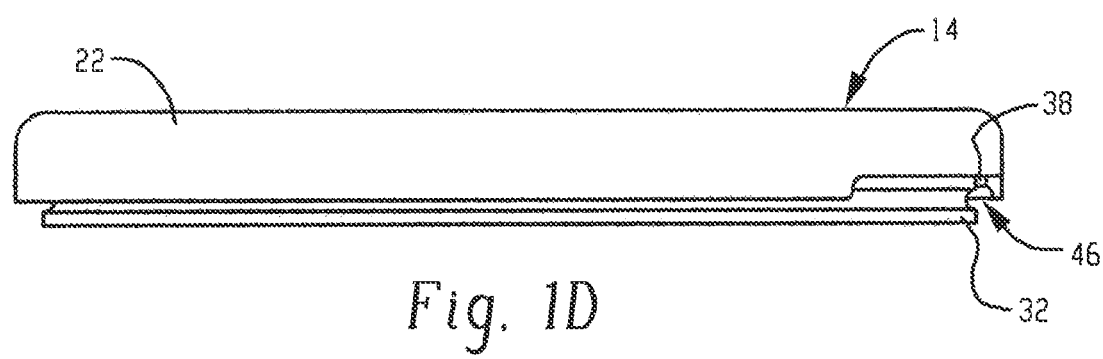
FIG. 1D is an end view of the first housing half.
Figure 1E:
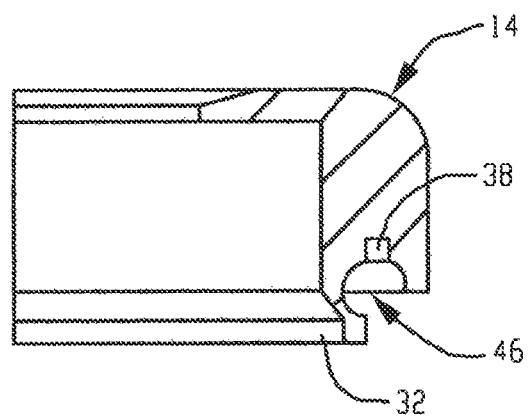
FIG. 1E is a partial cross-sectional view of the first housing half taken along the line 1E-1E in FIG. 1A.
Figure 2A:
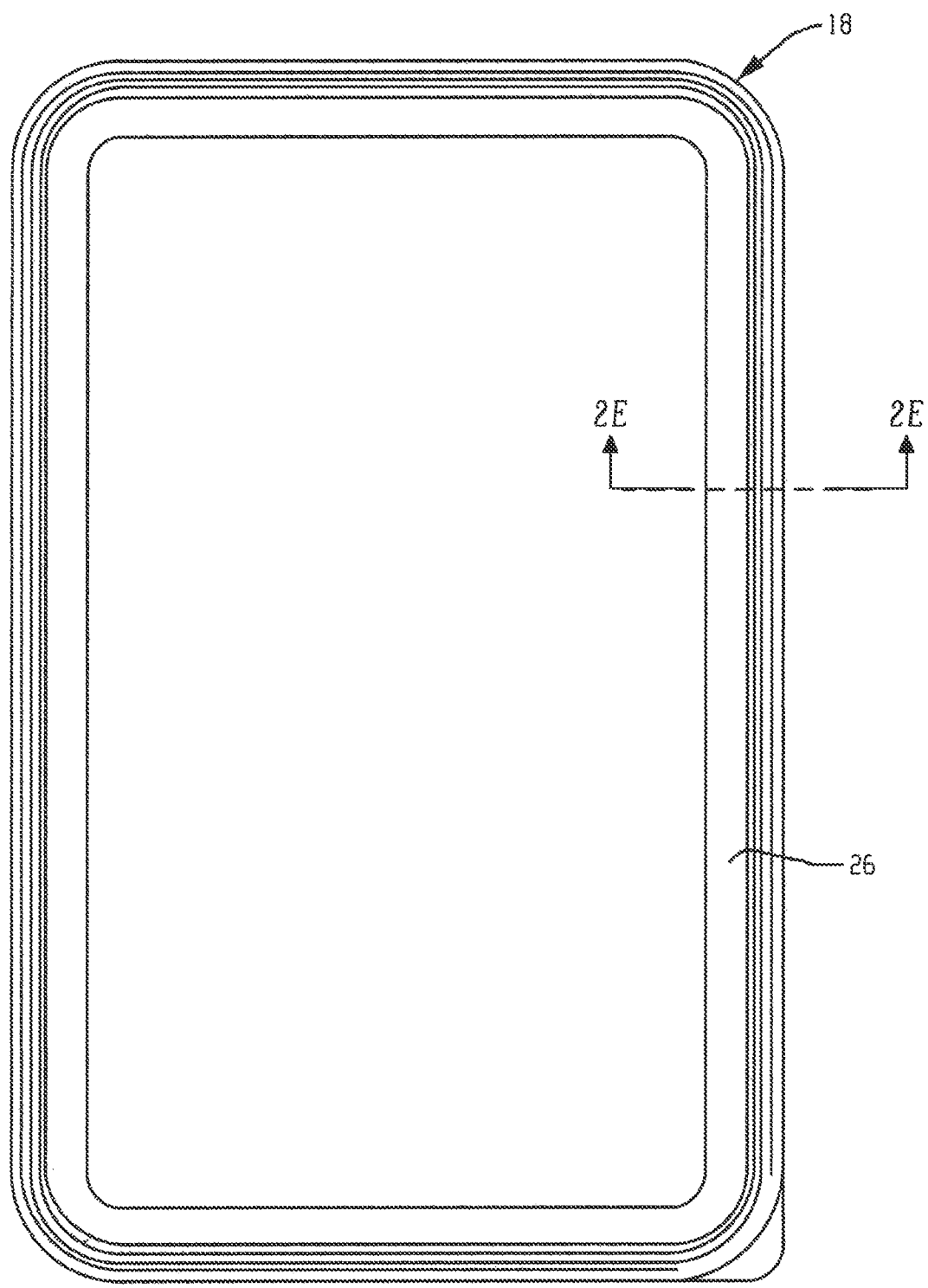
FIG. 2A is a top view of a second housing half of the exemplary enclosure.
Figure 2B:
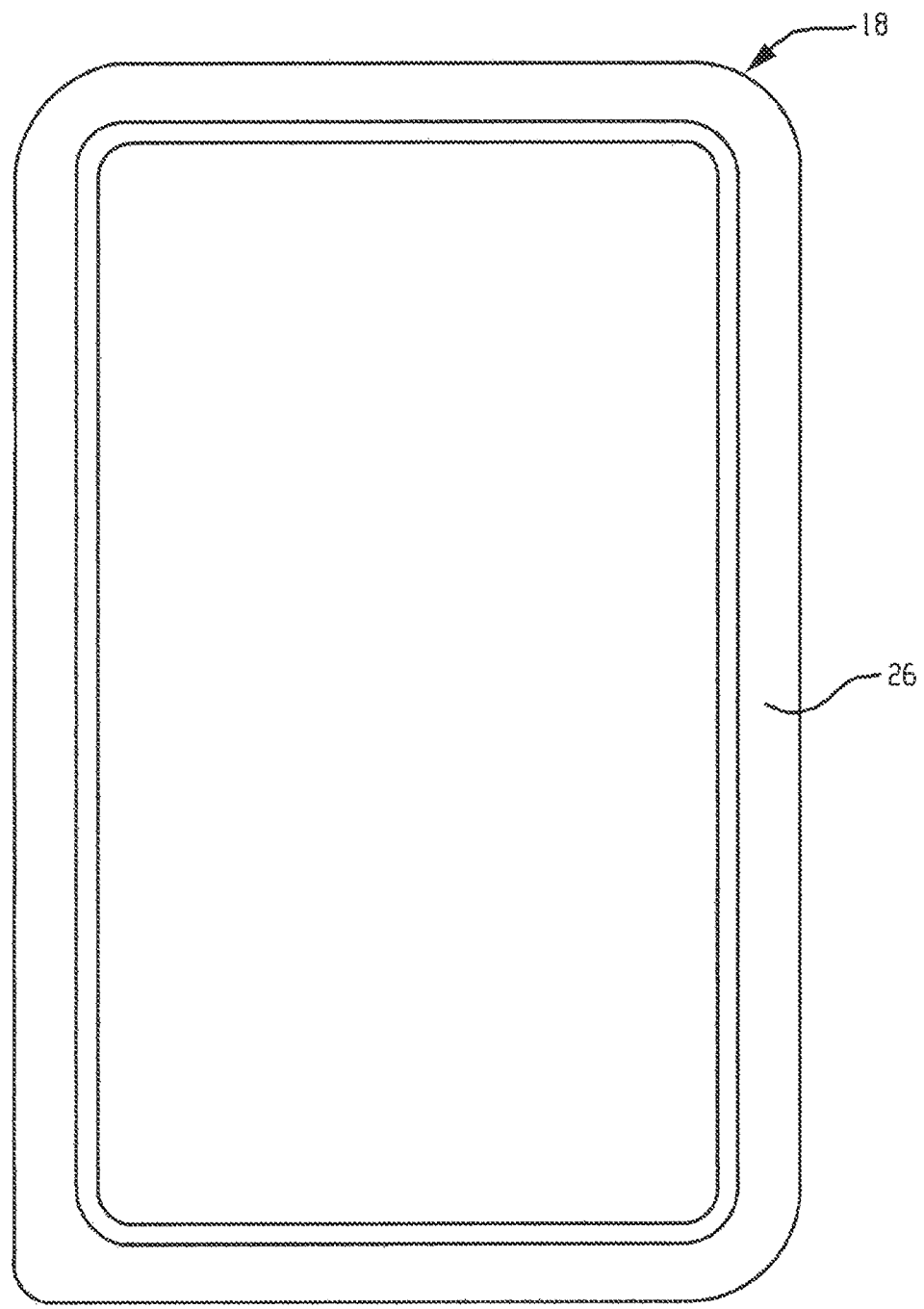
FIG. 2B is a bottom view of the second housing half.
Figure 2C:
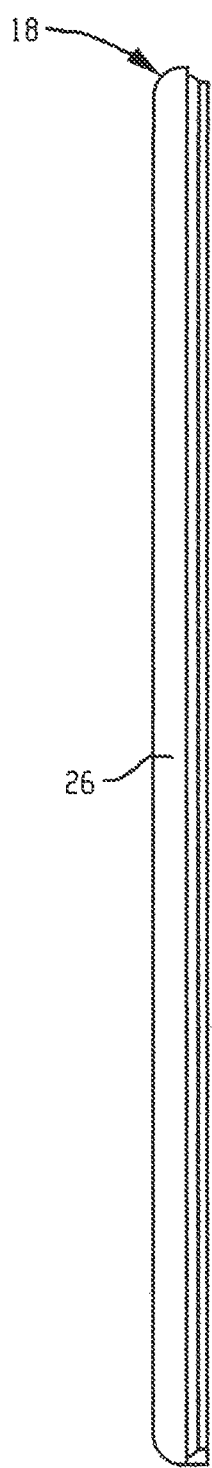
FIG. 2C is a side view of the second housing half.
Figure 2D:
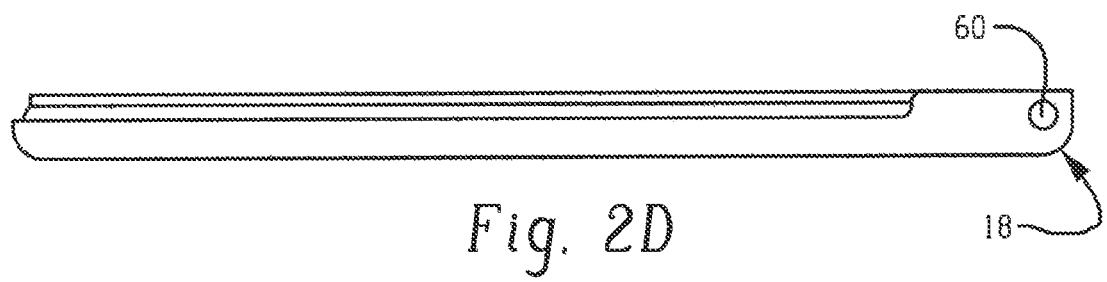
FIG. 2D is an end view of the second housing half.
Figure 2E:
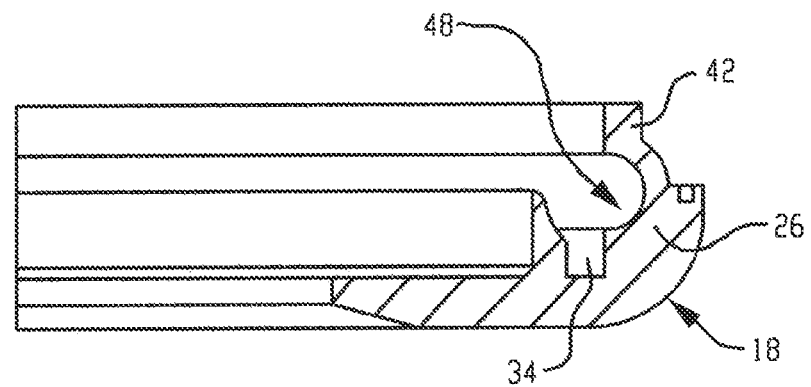
FIG. 2E is a cross-sectional view of the second housing half taken along the line 2E-2E in FIG. 2A.

With initial reference to FIGS. 1A-1E and 2A-2E, the exemplary enclosure 10 generally comprises first and second housing halves 14 and 18 (e.g., a front cover and a back cover). The first housing half 14 is illustrated in FIGS. 1A-1E and includes a first housing half body 22 having an opening in which a transparent lens 24 is supported. The transparent lens 24 allows a user to view and/or operate a user interface (e.g., touchscreen) of an electronic device 25 when mounted in the enclosure 10 (see FIG. 5). The second housing half 18 is illustrated in FIGS. 2A-2E and includes a second housing body 26 that can similarly include one or more transparent lenses (not shown) for exposing certain sensors or devices (camera, infrared, LED, etc.), or other parts/regions on a rear surface of the electronic device 25. The lenses can be secured to the housing bodies 22 and/or 26 with a suitable adhesive, for example.

Figure 3:
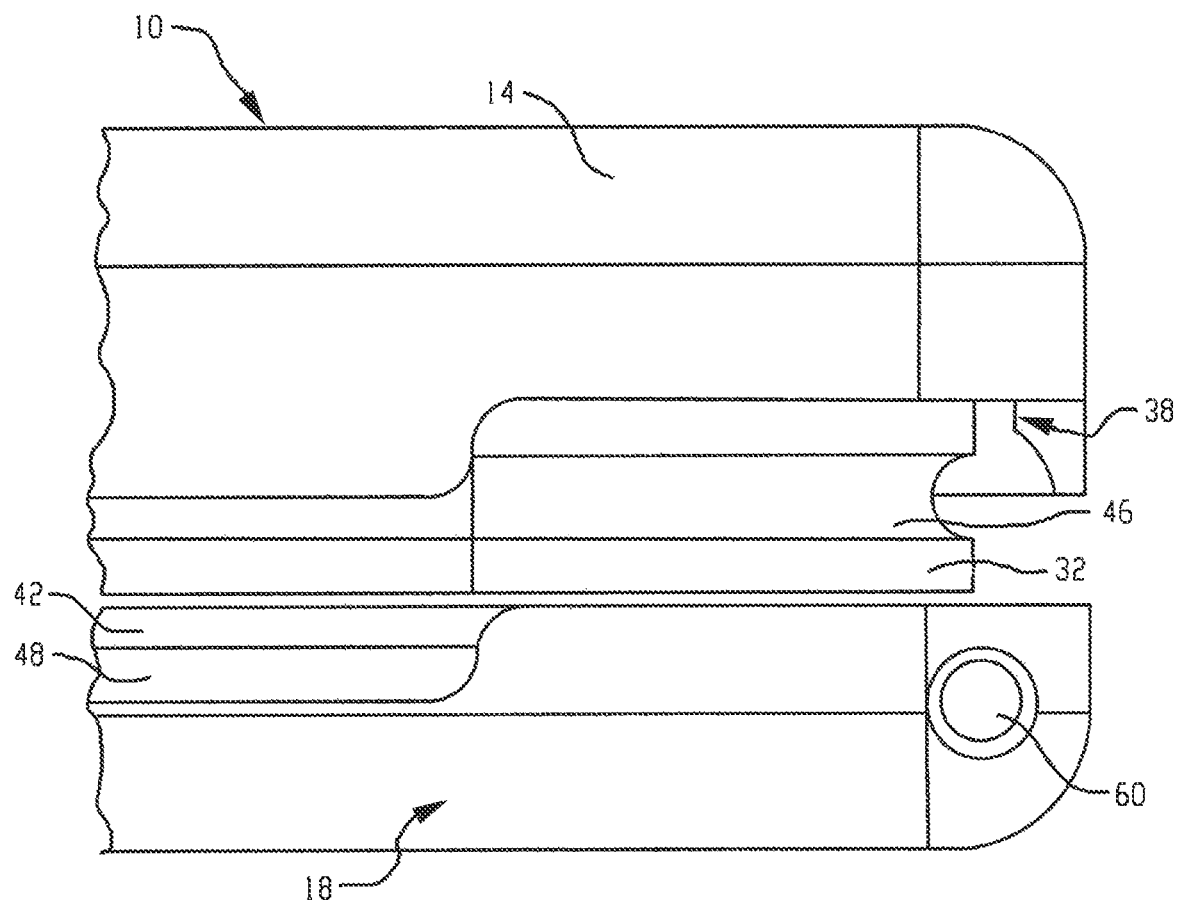
FIG. 3 is an end view of the first and second housing halves prior to assembly.
Figure 4:
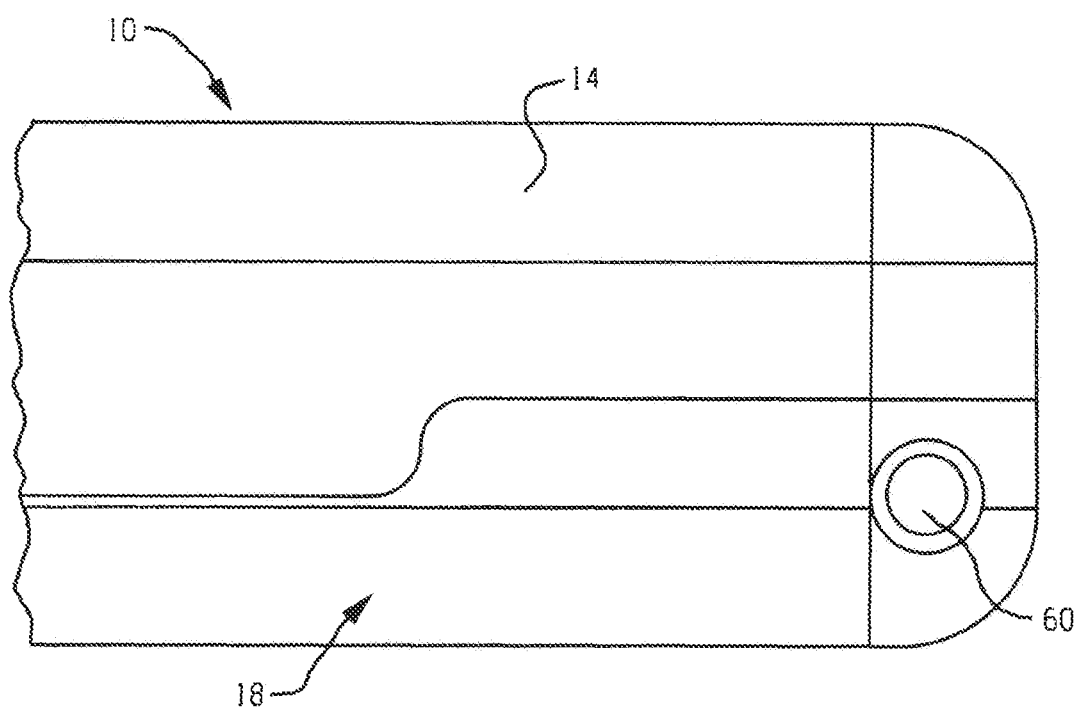
FIG. 4 is an end view of the first and second housing halves after assembly.
Figure 5:
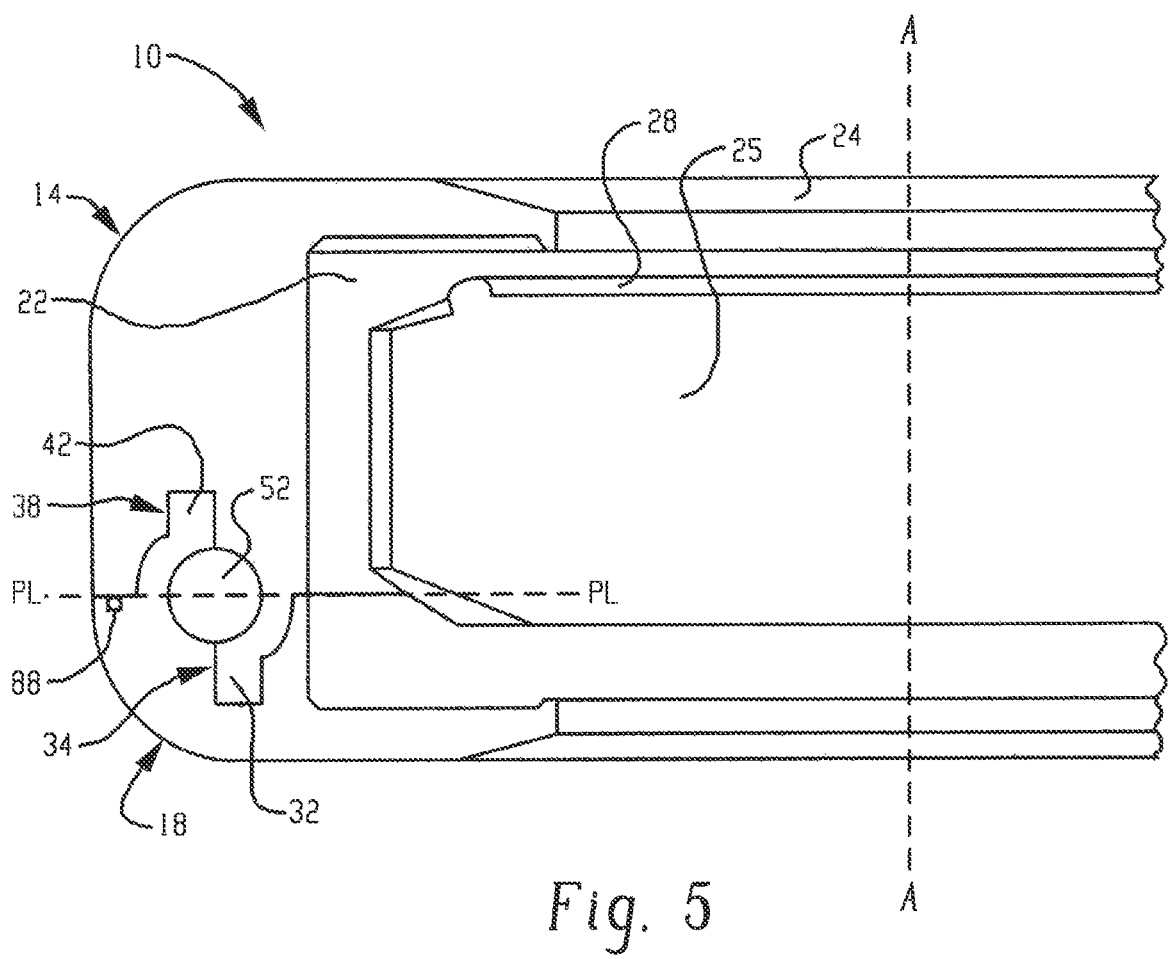
FIG. 5 is a partial cross-sectional view of the exemplary enclosure after assembly of the first and second housing halves.

The first and second housing bodies 22 and 26 are adapted to be joined together by positioning the first housing half 14 over the second housing half 18, as shown in FIG. 3, and bringing the first and second housing halves 14 and 18 into a mated configuration, as shown in FIG. 4 (e.g., by bringing the components together along an axis A-A extending perpendicular to the lens 24, as shown in FIG. 5, for example) to form an interior chamber 28 in which the electronic device 25 is supported. As will be appreciated, the interior chamber 28 is configured to prevent any ignition source originating within the interior chamber 28 from propagating to the exterior of the enclosure 10. To this end, each of the first and second housing bodies 22 and 26 have a mating flange and channel pair that are configured to mate, when assembled, to thereby create a labyrinth interface (best shown in FIG. 5) between the first and second housing bodies 22 and 26. The labyrinth interface restricts the escape a spark or other ignition source from the interior of the enclosure to the exterior environment, which may environment may contain combustible materials. In the illustrated embodiment, the labyrinth interface generally includes at least two 90 degree changes in direction. Other configurations are also possible.

With reference to FIG. 5, the first housing body 22 includes a flange 32 generally extending about its periphery configured to be received into a correspondingly-shaped channel 34 extending about the periphery of the second housing body 26. The first housing body 22 further includes a channel 38 extending peripherally about the first housing body 22 adjacent to the flange 32 (and on a radially outer side of the flange 32 from axis A) that is adapted to receive a flange 42 generally extending peripherally about the second housing body 26 adjacent to the channel 34.

Figure 6:
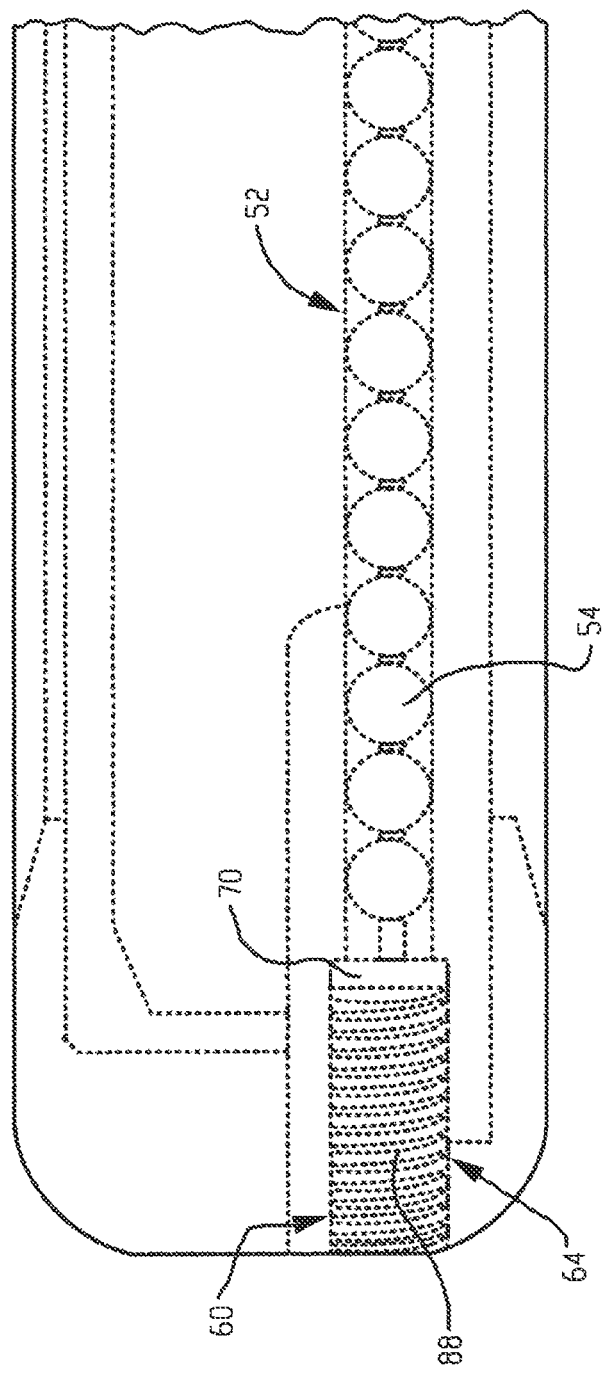
FIG. 6 is a partial cross-sectional view taken through the passageway at least partially formed by structures of the first and second housing halves illustrating the exemplary retaining member received therein in accordance with the present disclosure.
Figure 7:
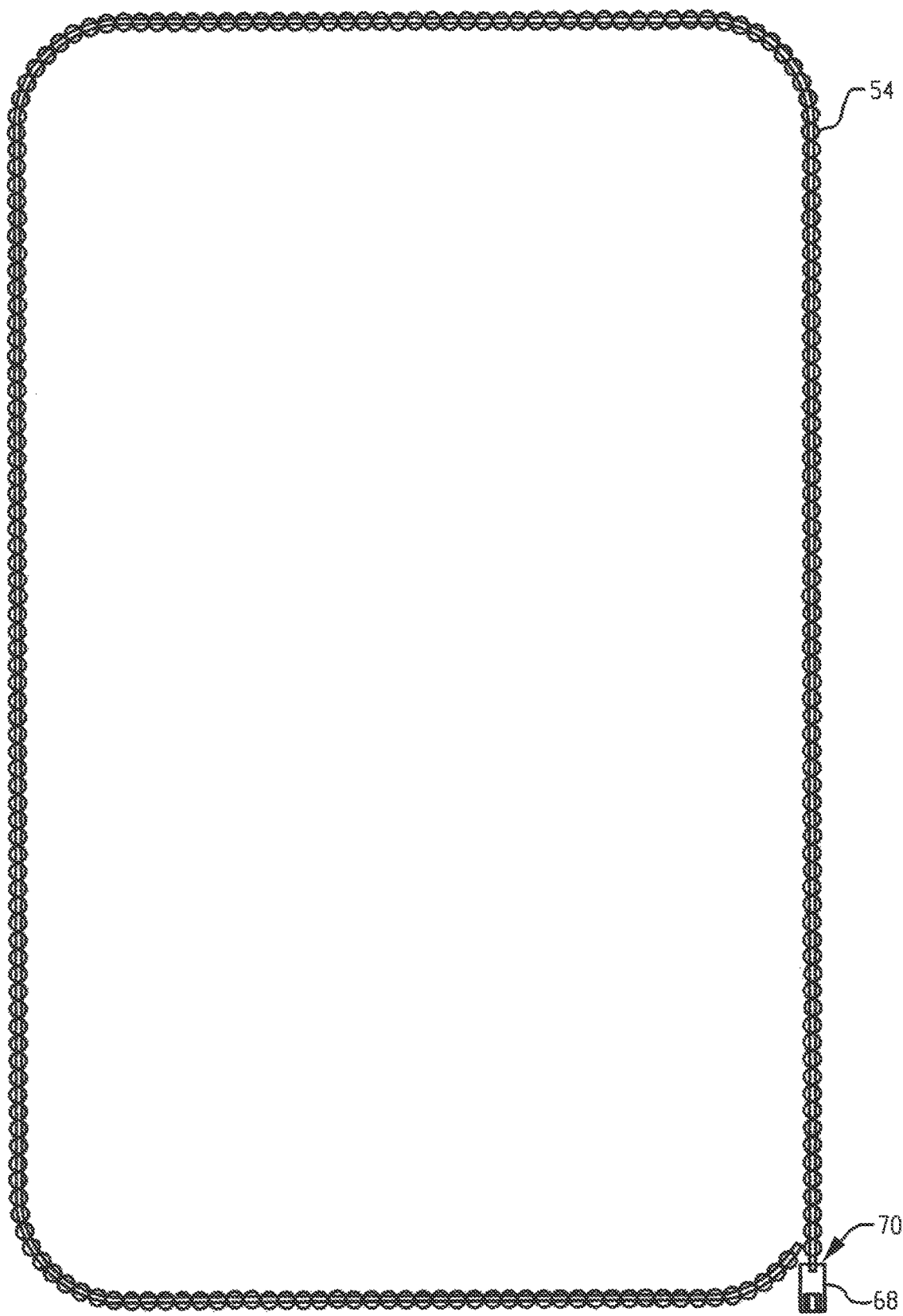
FIG. 7 is an overhead view of the exemplary retaining member.

With additional reference to FIG. 6, each of the flanges 32 and 42 include a respective recess 46 and 48 that together at least partially form a passageway 52 in which a flexible retaining member is installed to restrict separation of the first housing half 14 from the second housing half 18. The flexible retaining member, which is in the form of a ball-chain 54 in the illustrated embodiment, restricts relative movement between the first housing half 14 and the second housing half 18 by interference between the ball chain 54 and respective surfaces of the recesses 46 and 48 in each flange 32 and 42 and channels 34 and 38. The passageway 52 in the illustrated embodiment has a generally round cross-sectional shape (each of the recesses 46 and 48 in the flanges 32 and 42 and the channels 34 and 38 having a semi-circular cross-sectional shape) and generally extends in a coextensive fashion with the flanges 32 and 42 completely surrounding the internal chamber 24. As such, the first housing half 14 and the second housing half 18 are secured together along their entire peripheries.

The second housing half 18 includes an aperture 60 in communication with the passageway 52 for insertion and/or removal of the ball-chain 54 when the first and second housing halves 14 and 18 are in a mated configuration. An initial portion of the aperture 60 includes a threaded region 64 for receiving a closure member (e.g., a screw 68 in the illustrated embodiment) for closing off the aperture 60 (in an explosion proof manner) after insertion of the ball chain 54. An O-ring seal 70 is provided for sealing the screw 60 to the second housing half 18 within the aperture 60. In some embodiments, the closure member can be formed integrally with the flexible retaining member.

Figure 8:
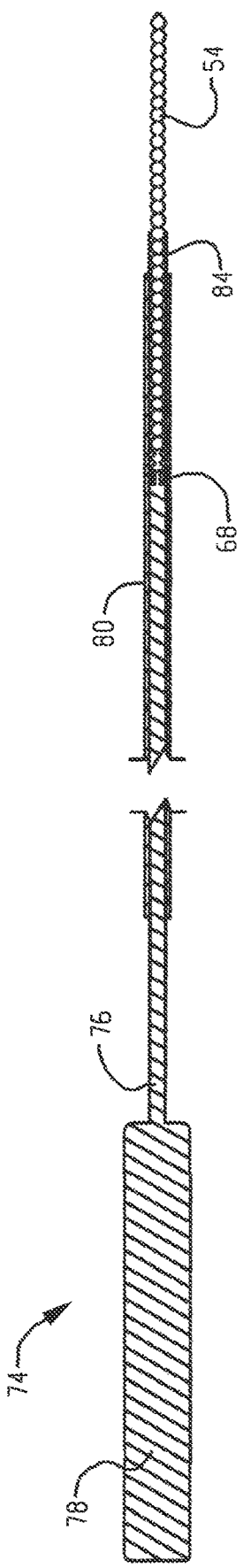
FIG. 8 is a cross-sectional view of an exemplary tool for inserting the exemplary retaining member into the passageway of the enclosure.

Turning to FIG. 8, a tool 74 is illustrated for inserting the flexible retaining member into the passageway 52 of the enclosure 10. The tool 74 includes a push rod 76 with a handle 78, a tube 80 in which the push rod 76 is telescopically received in a first end, and a split sleeve 84 telescopically received in a second end of the tube 80. In use, the push rod 76 is initially withdrawn from the tube 80 either completely or sufficiently such that the screw 68 and the ball-chain 54 can be loaded into the tube 80 from the opposite end. The split sleeve 84 is positioned around an end portion of the ball-chain 54 protruding from the tube 80.

Assembly of the enclosure 10 can be carried out in the following exemplary manner:

Install one or more lenses 24 to the first and second housing bodies 22 and/or 26 as appropriate;
Place the electronic device 25 between the first and second housing halves 14 and 18;
Bring the first and second housing halves 14 and 18 together around the electronic device 25 along axis A-A, aligning the respective flanges and channels in each housing half;
Fully seat respective flanges into the respective mating channels;
Insert the ball-chain into the aperture using the tool 74 to initially align an end of the ball-chain in the aperture with split sleeve 84, and then fully insert the ball-chain 54 using the pushrod 76 (removing the split sleeve 84 once the ball-chain 54 is sufficiently inserted);
Install screw 68 into aperture 60.
Disassembly of the enclosure can be performed by reversing the above steps.

It should be appreciated that the relative tolerance between the passageway 52 (as formed by the first and second housing halves 14 and 18), and the ball-chain 54, ensures a tight fit between the housing halves 14 and 18. To this end, in some embodiments it may be required to compress the housing halves 14 and 18 slightly to align the recesses 46 and 48 such that the ball-chain 54 can be readily inserted into the passageway 52. In other words, slight misalignment in the axial direction (e.g., along axis A-A) of the recesses 46 and 48 may create a slightly out-of-round passageway 52 making insertion of the ball-chain 54 difficult. By slightly compressing the housing halves 14 and 18 during assembly, the passageway 52 can be brought into a more uniformly round shape that facilitates insertion of the ball-chain 54. Then, once the ball-chain 54 is installed within the passageway 52, the first and second housing halves 14 and 18 generally remain in the tightly joined configuration even after removal of the compression force.

It should further be appreciated that a sealing member 88 is provided for sealing out contaminants such as dust and/or water from the interior chamber 28. The sealing member 88 may be slightly compressed when the first and second housing halves 14 and 18 are joined together by the ball-chain 54. The sealing member 88 in the illustrated embodiment is located outboard of the passageway.

In certain embodiments, the ball-chain 54 and/or screw 68 can be non-metallic. For example, one suitable non-metallic ball-chain is made of aramid and glass or plastic balls. Other materials are also possible. Accordingly, it will be appreciated that aspects of the present disclosure are directed to explosion-proof enclosures that require no metallic components.

It should also be understood that the flanges and channels in each of the first and second housing bodies 22 and 26 are similar in cross-sectional shape, though this is not required in all instances. As best seen in FIG. 5, each flange is supported on opposite sides within its respective recess. This enhances the strength of the joint. Further, the passageway 52 is centered along a parting line PL of the first and second housing halves 14 and 18.

As described above, the recesses 46 and 48 are said to be formed in both the flange and the channel of the mating structure of each housing half. It should be appreciated that this is because the parting line PL is used arbitrarily to divide the flange from the channel. In some embodiments, the recesses 46 and 48 can be entirely formed in the flange or channel, and such modifications do not exceed the scope of the present disclosure.

With further reference to FIGS. 9A-11E, alternative mechanisms for advancing an exemplary ball-chain through the channel 52 are shown, including a ball-screw 102 (FIGS. 9A-9C), a ball-wheel 202 (FIGS. 10A-10D) and a spindle 302 (FIGS. 11A-11E.

With initial reference to FIGS. 9A and 9B, the ball-screw 102 generally comprises a generally cylindrical body 104 having threads 106. The threads 106 are sized to correspond to the balls of the ball chain 54 such that individual balls can be engaged between adjacent threads 106. Rotation of the ball-screw 102 can be effected in any suitable manner, such as by insertion of a rotary tool into non-circular recess 108.

With additional reference to FIG. 9C, the ball-screw 102 can be supported for rotation in a bore 110 one of the first or second housing halves 14 and 18 adjacent the passageway 52. In other embodiments, the ball-screw 102 can be provided as part of a separate tool that is only associated with the enclosure during assembly and/or disassembly. As will be appreciated, rotation of the ball-screw 102 results in linear translation of the ball-chain 54 within the passageway 52. To this end, in the illustrated embodiment clockwise rotation advances the ball-chain 54 into the passageway 52, while counterclockwise rotation withdraws the ball-chain 54 from the passageway 52. Therefore, the ball-screw 102 can be used both during assembly and disassembly of the enclosure. It will be appreciated that the direction of rotation of the ball-screw 102 to effect advancement or withdrawal of the ball-chain 54 is dependent on direction of the threads of the ball-screw 102 (e.g., left or right hand threads).

FIGS. 10A-10D illustrate the ball-wheel 202 for advancing or withdrawing the ball-chain 54 from the passageway 52. The ball-wheel 202 generally included first and second wheels 204 and 208 each having a plurality of recesses 210 sized to receive a portion of an individual ball of the ball-chain 54. Together, the wheels 204 and 206 form a nip 212 for advancing or withdrawing the ball-chain 54 from the passageway 52, depending on the direction of rotation of the ball-wheel 202. As will be appreciated, the ball-wheel 202 can be integrated into the first and/or second housing halves 14 and 18, or can be provided as a separate tool for use during assembly/disassembly.

Figure 11A:
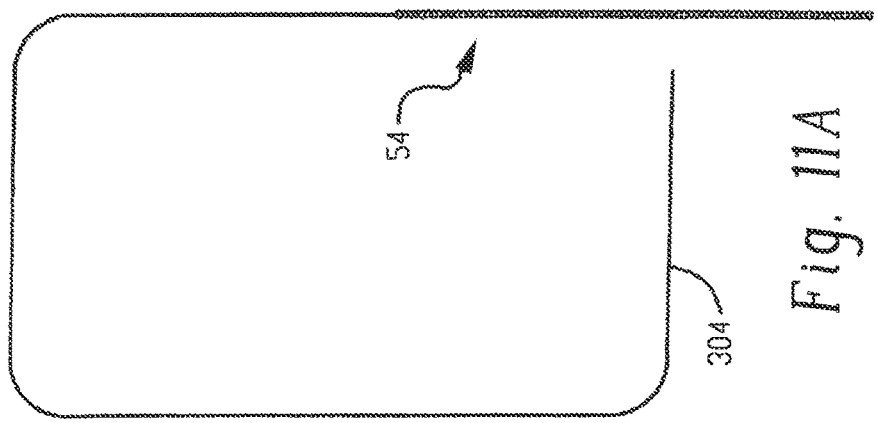
FIG. 11A is a plan view of an exemplary ball-chain with lead in accordance with the present disclosure.
Figure 11C:
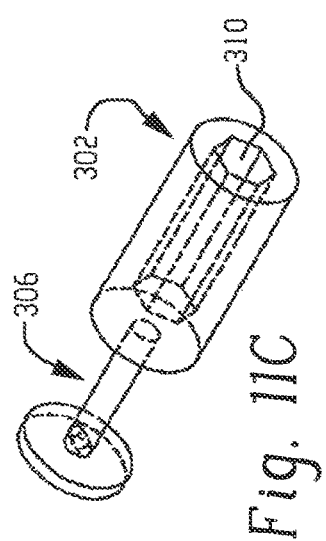
FIG. 11C is a perspective view of the spindle of FIG. 11B.
Figure 11D:
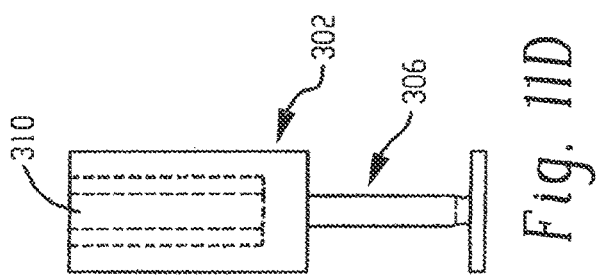
FIG. 11D is a side view of the spindle of FIG. 11B.
Figure 11B:
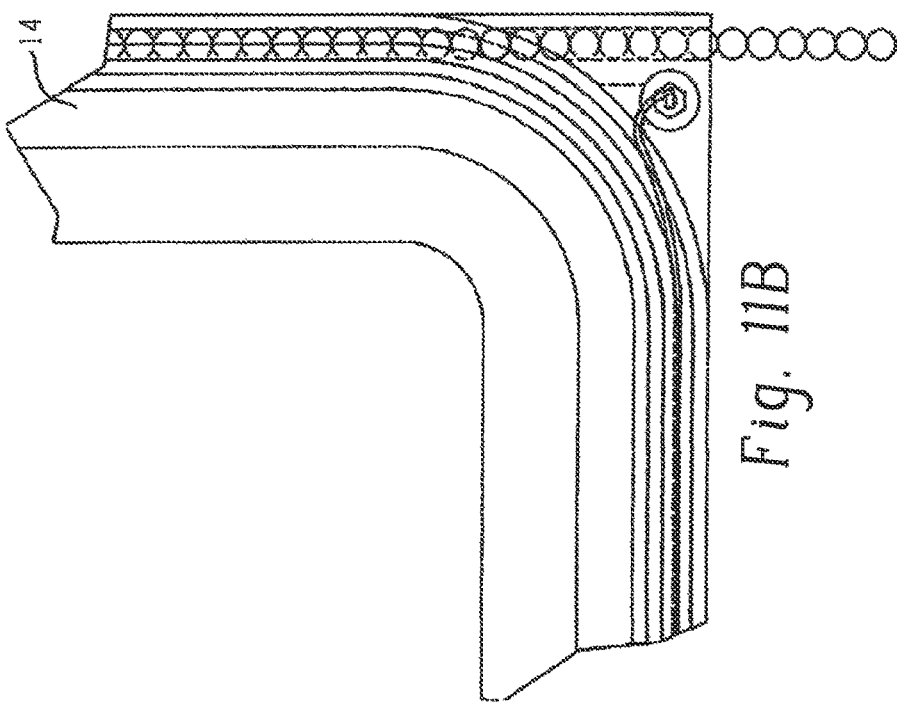
FIG. 11B is a plan view of a portion of an enclosure including a spindle in accordance with the present disclosure.
Figure 11E:
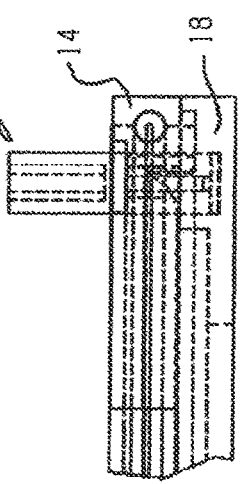
FIG. 11E is a partial cross-sectional view taken through the spindle of FIG. 11B.
Figure 12:
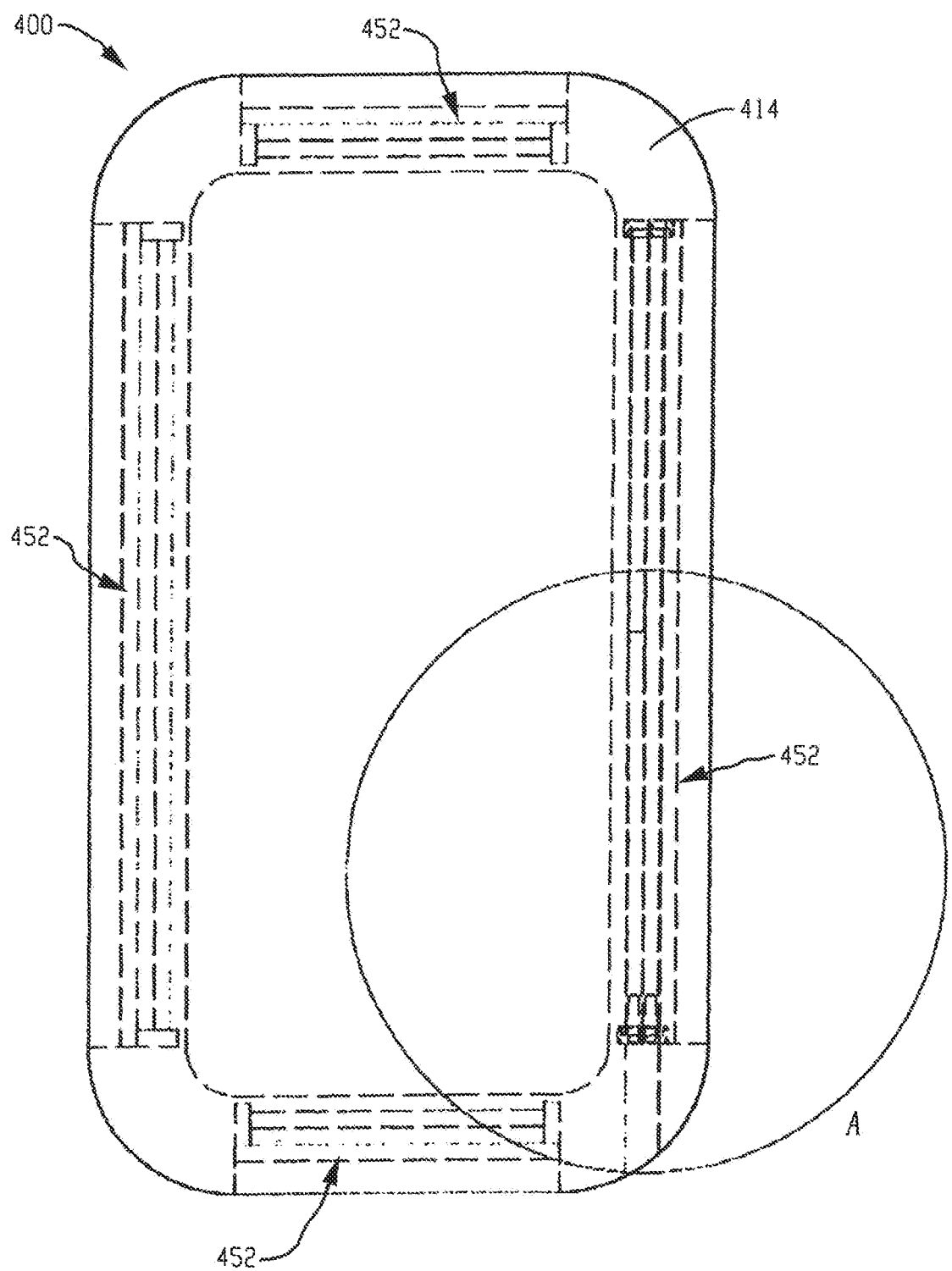
FIG. 12 is a plan view of an enclosure in accordance with the present disclosure, with location of interior passageways and retention members shown in dashed lines.
Figure 13:
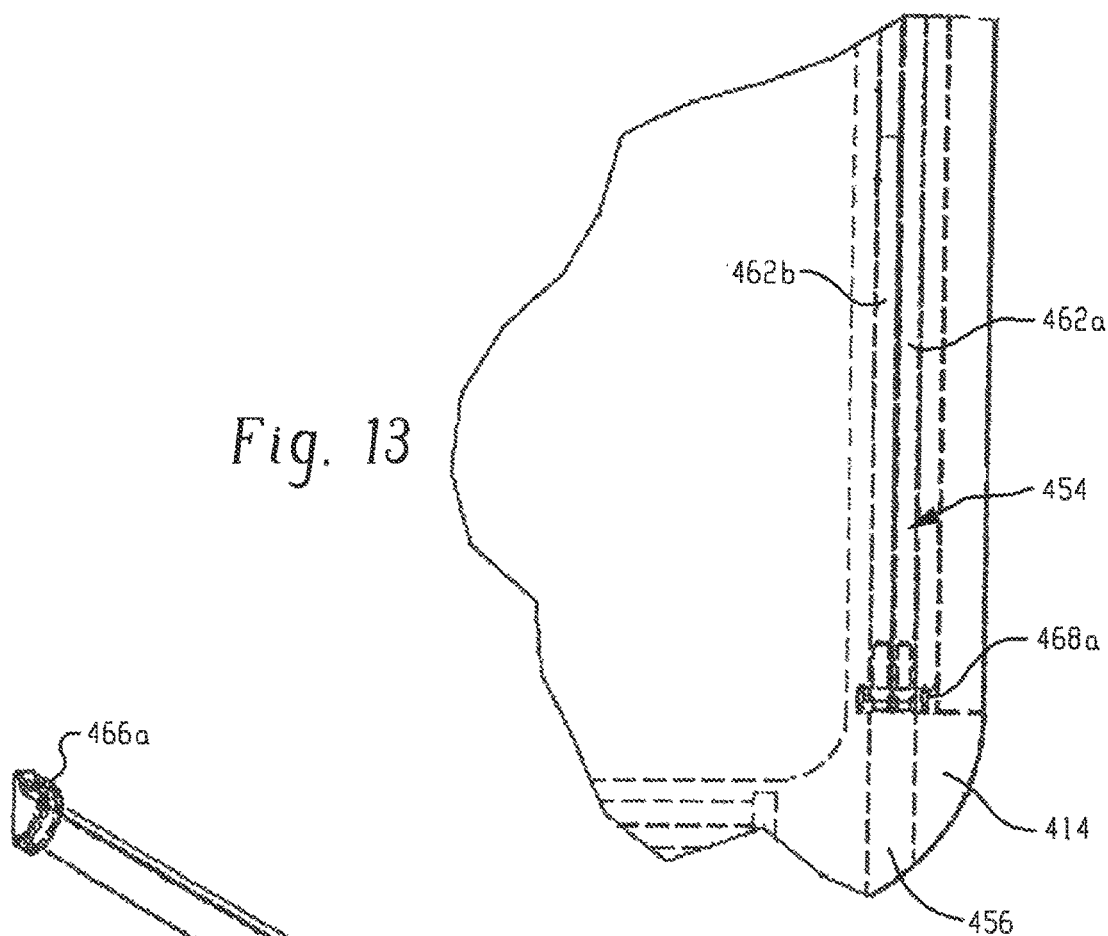
FIG. 13 is an enlarged portion A of FIG. 12.

FIGS. 11A-11E illustrate the spindle 302 in detail. In this embodiment, the ball-chain 54 includes a lead 304 that is generally smooth, flexible and of a smaller diameter than the remainder of the ball-chain 54. The lead 304 is configured to be easily advanced manually through the passageway 52 by virtue of its small diameter and flexibility, as shown in FIG. 11B. The lead 304 then engages a drum portion 306 of the spindle 302 such that rotation of the spindle 302 wraps the lead around the drum portion 306 thereby drawing the ball-chain through the passageway 52. Rotation of the spindle 302 can be effected in any suitable manner, such as by insertion of a tool into non-circular bore 310. As shown, the spindle 302 is supported for rotation in the first and/or second housing halves 14 and 18.

Turning now to FIGS. 12-20, an exemplary enclosure 400 is illustrated. In this embodiment, a split retention member 454 is shown for securing first and second housing halves 414 and 418 together. As will be appreciated, the first and second housing halves 414 and 418 together form an internal passageway 452 in a similar manner as first and second housing halves 14 and 18 described above. However, in this embodiment, rather than a continuous passageway that spans circumferentially around all four sides of the enclosure, each respective side of the enclosure 400 has a discrete passageway 452 along a circumferential (outer) edge thereof. That is, there is a passageway 452 along each of the top, bottom and left and right sides of the enclosure 400. The reason for the discrete passageways 452 will become apparent with the discussion of the retention member 454 that follows below. Each passageway 452 is open to an exterior of the enclosure via an aperture 456. For the sake of simplicity, only one aperture 456 is illustrated, however, it should be appreciated that each passageway 452 includes an aperture for accessing and/or manipulating the retention member 454 received therein, as will be described.

The retention member 454 in this embodiment is comprised of first and second portions 462a and 462b, semi-cylindrical in shape, that together form the generally cylindrical retention member 454 when brought together. A particular advantage of this embodiment is that the respective halves of the retention member 454 are fitted and retained in the respective halves of the housing 414 and 418. To this end, and with reference to FIGS. 14 and 15, in can be seen that the first and second portions 462a/462b each include a flange 466a at each end thereof. The flanges 466a are configured to be tightly received in a corresponding counterbore 468a of the respective half of the retention member 454 in which the first/second portion of the retention member is received. In this manner, the first and second portions of the retention member can be releasably retained to a respective half of the enclosure.

Figure 14:
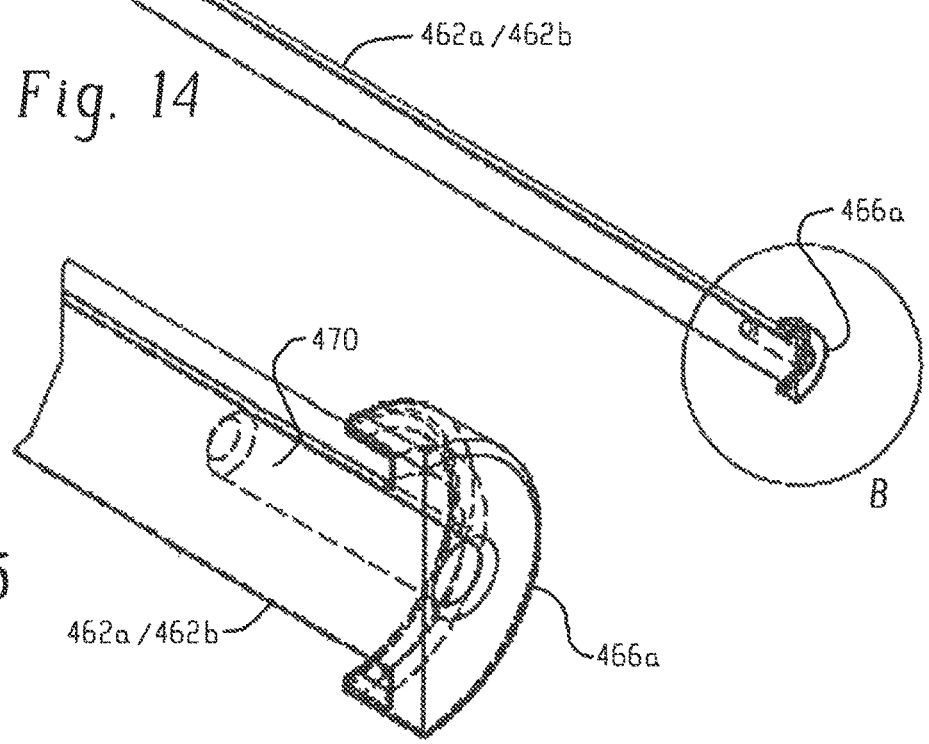
FIG. 14 is a perspective view of a half of a retention member of the enclosure of FIGS. 12 and 13.
Figure 15:
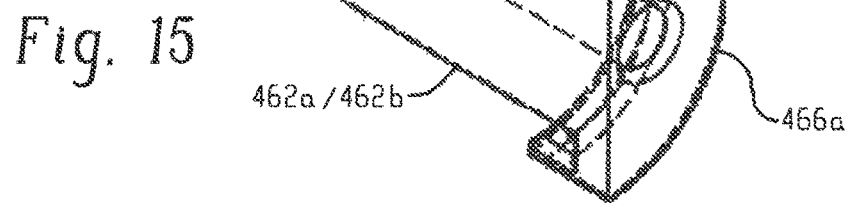
FIG. 15 is an enlarged portion B of FIG. 14.

Also shown in FIGS. 14 and 15 is a bore 470 that is configured to receive a tool for rotation of the retention member 454, as will be described in connection with the remaining figures.

Turning to FIGS. 16-19, the first and second portions 462a and 462b are configured to be received in respective grooves 484a and 484b of the first and second halves 414 and 418. The grooves 484a and 484b together define the generally cylindrical passageway 452 that extends longitudinally along/adjacent a periphery of an internal chamber of the enclosure 400. As will be appreciated, similar passageways are provided on each side of the enclosure as noted above.

Figure 17:
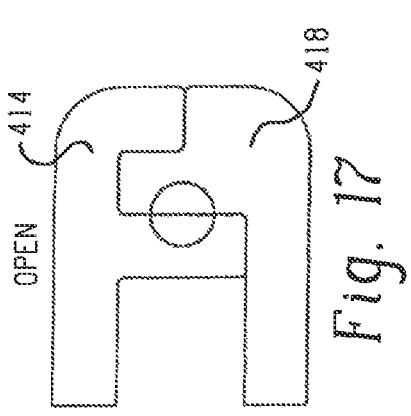
FIG. 17 is a side view of the exemplary assembly of FIG. 16 after assembly with the retention member in an unlocked position.
Figure 16:
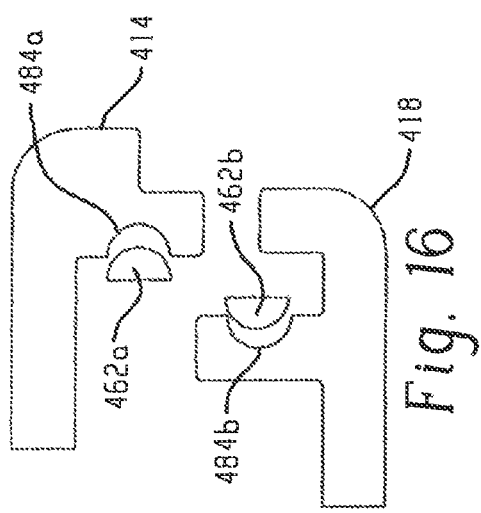
FIG. 16 is a side view an exemplary assembly in accordance with the present disclosure prior to assembly.
Figure 18:
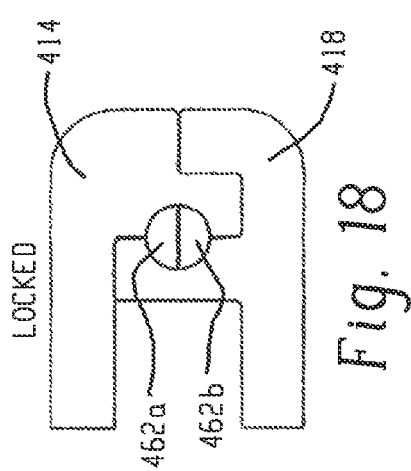
FIG. 18 is a side view of the exemplary assembly of FIG. 16 after assembly with the retention member in a locked position.
Figure 19:
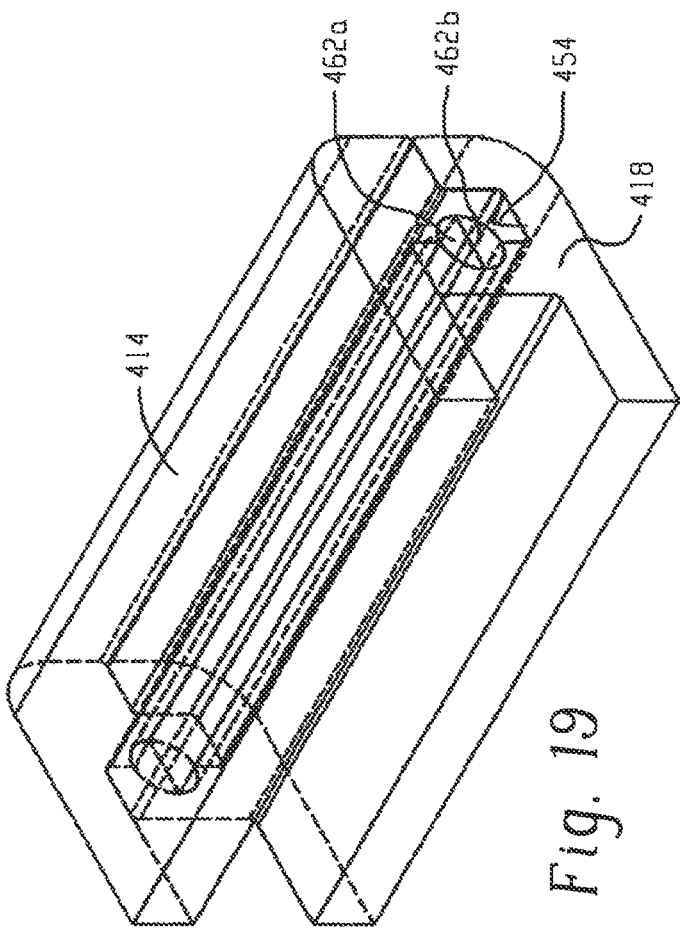
FIG. 19 is a perspective view of the assembly with the retention member in the locked position.
Figure 20:
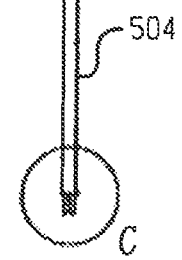
FIG. 20 is an elevational view of exemplary tool for rotating the retention member of the enclosure of FIG. 12.
Figure 22:
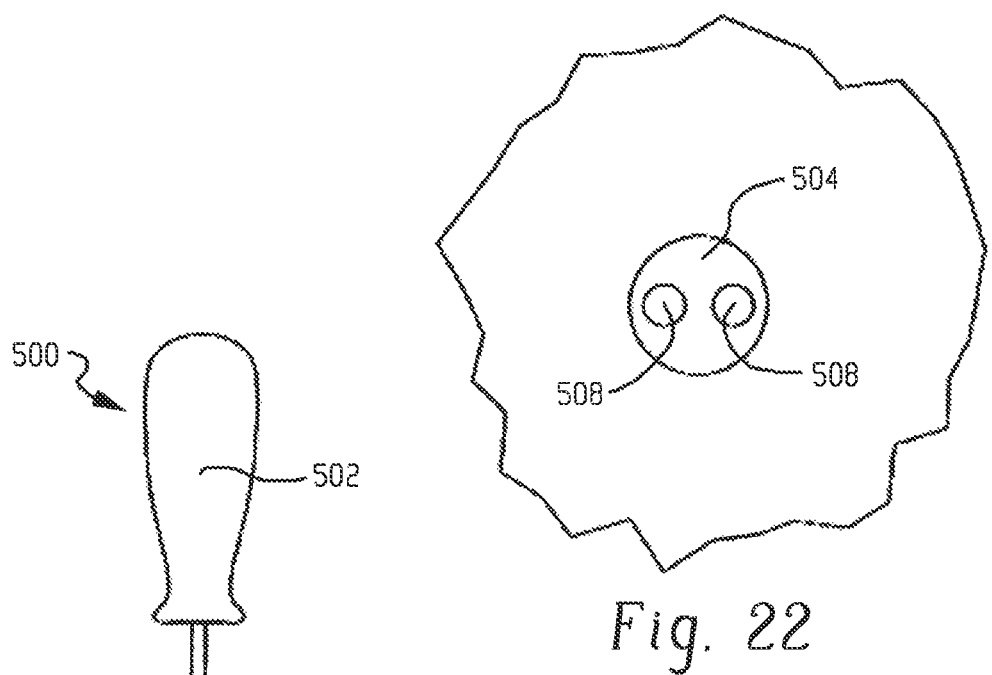
FIG. 22 is a bottom view of the tool of FIG. 20.
Figure 21:
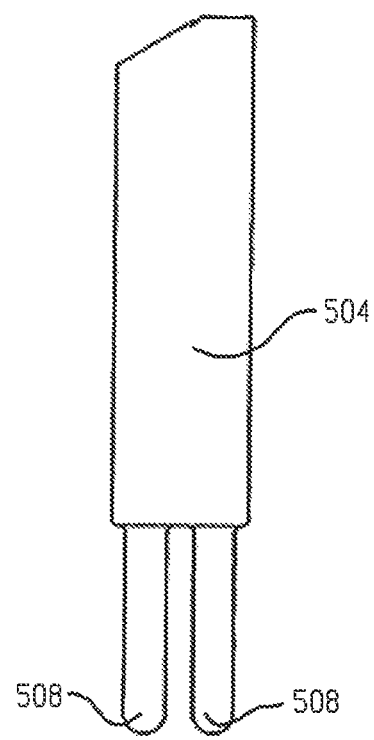
FIG. 21 is an enlarged portion C of FIG. 20.

With reference to FIGS. 17-19, it will be appreciated that the first and second halves 414 and 418 can be brought together with the first and second portions 462a and 462b of the retention member 454 in the positions shown in FIG. 17 (e.g., the interface of the first and second portions 462a and 462b being aligned vertically in FIG. 17, also referred to as an unlocked position). To secure the first and second halves 414 and 418 together, the first and second portions 462a and 462b are rotated to the position shown in FIGS. 18 and 19 (e.g., the interface of the first and second portions 462a and 462b being aligned horizontally in FIG. 18, also referred to as a locked position). In this position, it can be seen that the retention member 454 interferes with surfaces of the first and second halves 414 and 418 such that the halves cannot be separated from each other.

Rotation of the first and second portions 462a and 462b can be effected by engaging the same with a suitable tool via the aperture 456 in each portion. An exemplary tool 500 for such purpose is shown in FIGS. 20-23. The tool 500 includes a handle 502 and a shank 504 extending from the handle 502. A terminal end of the shank 504 includes a pair of prongs or protrusions 508 for engaging in the bores 470 of each of the first and second portions 462a and 462b of the retention member 454. Rotation of the handle 502 results in corresponding rotation of the first and second portions 462a and 462b of the retention member 454 between the unlocked and locked positions.

It should now be appreciated that the retention member 454 can be used to secure together two components in the manner described above. Accordingly, use of the retention member 454 is not limited to tablet enclosures or the like, and aspects of the present disclosure will find a wide variety of applications for joining together components. As with the other embodiments, the retention member 454 permits selective disassembly of the components. In this case, the first and second portions 462a and 462b are rotated back to the position shown in FIG. 17, at which time first and second halves 414 and 418 can be separated from each other.

As will now be understood, the present disclosure sets forth an enclosure with features that simplify construction and assembly while providing enhanced performance. An enclosure in accordance with the present disclosure requires fewer components than enclosures using fasteners such as bolts or screws, yet still offers the ability to disassemble the enclosure to access the electronic device. The closure mechanism can be adapted to a wide range of shapes and sizes of enclosures without changing the nature of the mechanism. As such, certification of new designs by the appropriate authorities is expected to be easier as compared to certification of new designs employing prior art closure mechanisms, such as fasteners.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An enclosure for an electronic device comprising first and second housing portions adapted to be joined together by a retention member received in a passageway at least partially formed by portions of each of the first and second housing portions, the passageway extending longitudinally along at least a portion of a periphery of an internal chamber of the enclosure, wherein the retention member restricts separation of the first and second housing portions when received in the passageway, wherein the passageway extends continuously about a periphery of the enclosure and is curved along one or more portions of its length, and the retention member is flexible about its longitudinal axis such that it can be inserted longitudinally into the passageway.

2. The enclosure of claim 1, wherein the first and second housing portions included mating structures, said mating structures at least partially forming the passageway.

3. The enclosure of claim 2, wherein each mating structure includes a flange and a channel, said flange and channel of a first mating structure of the first housing portion adapted to mate with a corresponding channel and flange, respectively, of a second mating structure associated with the second housing portion.

4. The enclosure of claim 3, wherein a surface of the flange and a surface of the channel of each mating structure forms at least a portion of the passageway.

5. The enclosure of claim 4, wherein the passageway has a circular cross-section, and each of the first and second housing portions includes a semi-circular recess that together form at least a portion of the passageway.

6. The enclosure of claim 5, wherein the passageway is centered on a parting line of the first and second housing portions, and wherein the mating structures form a labyrinth interface between the first and second housing portions.

7. The enclosure of claim 1, further comprising a sealing element located outwardly of the passageway, the sealing element extending continuously about a periphery of the enclosure.

8. The enclosure of claim 1, wherein the retention member includes a ball-chain.

9. The enclosure of claim 1, further comprising an aperture extending from the passageway to an exterior of the enclosure, the aperture providing a pathway for insertion of the retention member into the passageway from an exterior of the enclosure, and further comprising a closure member for closing the aperture.

10. The enclosure of claim 1, wherein the retention member is removable from the passageway to enable separation of the first and second housing portions.

11. The enclosure of claim 1, wherein the retention member includes a first portion retained in the first housing portion and a second portion retained in the second housing portion, the first and second portions of the retention member being semi-cylindrical in shape to thereby form the generally cylindrical retention member when the first housing portion and the second housing portion are assembled to form the passageway.

12. The enclosure of claim 1, in combination with an electronic device.

13. A method of assembling an enclosure for an electronic device comprising assembling a first and a second housing portion together to form an interior chamber for the electronic device, and installing a retention member into a passageway at least partially formed by the first and second housing members, the passageway extending longitudinally along at least a portion of a periphery of an internal chamber of the enclosure, wherein the retention member restricts separation of the first and second housing members, wherein the passageway extends continuously about a periphery of the enclosure, and further comprising using a tool to install the retention member in the passageway, the tool including at least one of a ball-screw, a ball-wheel, a spindle, or a push rod telescopically received in a tube adapted to support the retention member in position for insertion into the passageway.

14. The method of claim 13, wherein the enclosure includes an aperture in communication with the passageway and opening to an exterior of the enclosure, and further comprising installing the retention member in the passageway via the aperture.

15. The method of claim 14, further comprising installing a closure member in the aperture after insertion of the retention member.

16. The method of claim 15, wherein the first and second housing portions included mating structures, wherein each mating structure includes a flange and a channel, said flange and channel of a first mating structure of the first housing portion adapted to mate with a corresponding channel and flange, respectively, of a second mating structure associated with the second housing portion.

17. The method of claim 16, further comprising engaging the mating structures prior to insertion of the retention member in the passageway.

18. The method of claim 17, further comprising applying a compressive force to the first and second housing portions to align respective surfaces thereof forming the passageway, and inserting the retention member into the passageway while maintaining the application of the compressive force.

* * * * *